(12) United States Patent
Sakakibara et al.

(10) Patent No.: US 8,537,428 B2
(45) Date of Patent: Sep. 17, 2013

(54) IMAGE READING APPARATUS, CONTROL METHOD THEREOF, AND IMAGE FORMING APPARATUS

(75) Inventors: Jun Sakakibara, Tokyo-to (JP); Katsuya Nagamochi, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 826 days.

(21) Appl. No.: 12/756,427

(22) Filed: Apr. 8, 2010

(65) Prior Publication Data

US 2010/0259798 A1    Oct. 14, 2010

Related U.S. Application Data

(60) Provisional application No. 61/169,085, filed on Apr. 14, 2009.

(51) Int. Cl.
*H04N 1/40* (2006.01)
*H04N 1/04* (2006.01)

(52) U.S. Cl.
USPC ............ 358/446; 358/482; 358/483; 358/445

(58) Field of Classification Search
USPC ...... 358/445, 446, 483, 482, 514; 250/208.1, 250/234–236, 216; 348/229.1
See application file for complete search history.

(56) References Cited

U.S. PATENT DOCUMENTS

| 5,357,351 | A  | * | 10/1994 | Nakajima et al. | 358/482 |
| 5,436,737 | A  | * | 7/1995  | Nakajima et al. | 358/494 |
| 6,707,022 | B2 | * | 3/2004  | Perregaux       | 250/208.1 |
| 7,123,388 | B2 | * | 10/2006 | Ichihashi       | 358/483 |
| 7,164,509 | B2 | * | 1/2007  | Machida         | 358/482 |
| 7,605,951 | B2 |   | 10/2009 | Kagami          |  |

FOREIGN PATENT DOCUMENTS

| JP | 07203320   | 8/1995 |
| JP | 2002158837 | 5/2002 |

* cited by examiner

*Primary Examiner* — Cheukfan Lee
(74) *Attorney, Agent, or Firm* — Turocy & Watson, LLP (57) ABSTRACT

An apparatus includes a white reference member, an exposure lamp, a CCD sensor including a plurality of linear sensors connected in series, and a plurality of gain amplifiers which amplifies the outputs of the linear sensors, respectively. The apparatus selects one linear sensor, adjusts the gain of the gain amplifier corresponding to the selected linear sensor, adjusts the gain of the gain amplifier corresponding to the linear sensor existing to the left side of the selected linear sensor, and adjusts the gain of the gain amplifier corresponding to the linear sensor existing to the right side of the selected linear sensor. A difference in output at connecting positions among the line sensors is removed by adjusting the gains of gain amplifiers.

17 Claims, 8 Drawing Sheets

IMAGE READING APPARATUS, CONTROL METHOD THEREOF, AND IMAGE FORMING APPARATUS

CROSS-REFERENCE TO RELATED APPLICATION

This application is based upon and claims the benefit of priority from: U.S. Provisional Application No. 61/169,085 filed on Apr. 14, 2009, the entire contents of which are incorporated herein by reference.

FIELD

Embodiments described herein relate generally to an image reading apparatus reading an image, a control method thereof, and an image forming apparatus forming an image on a sheet.

BACKGROUND

In image reading apparatuses such as scanners and image forming apparatuses such as copiers, an exposure lamp is made to reciprocate along a document plate and an original document on the document plate is exposed by the exposure lamp at the time of moving forward. A CCD sensor which is a photoelectric conversion device receives light reflected from the original document in the exposure. The CCD sensor linearly scans the received light in a direction perpendicular to the moving direction of the exposure lamp and repeats the linear scanning with the forward movement of the exposure lamp. The direction of the linear scanning of the CCD sensor is the main scanning direction. The forward moving direction of the exposure lamp is the sub scanning direction.

In a CIS type in which the CCD sensor is made to reciprocate along the document plate along with the exposure lamp, the length of the CCD sensor in the linear scanning direction is almost equal to the width of the document plate. The CCD sensor includes plural linear sensors connected in series in a line shape and outputs an image signal with a voltage level corresponding to the amount of received light by performing a linear scanning operation using the reflected light received from the original document.

The outputs at connecting positions among the linear sensors of the CCD sensor may have a difference. This difference in outputs appears as a concentration spot at the time of forming an image.

DETAILED DESCRIPTION

In general, according to one embodiment, an image reading apparatus including: a white reference member; an exposure lamp exposing an original document and the white reference member; a CCD sensor including a plurality of linear sensors connected in series, configured to receive reflected light from the original document or the white reference member, and output an image signal with a voltage level corresponding to the amount of received light; a plurality of gain amplifiers configured to amplify the outputs of the linear sensors, respectively; an analog-to-digital converter configured to convert the output signals of the gain amplifiers in an analog-to-digital conversion manner and output the converted signals as image data of the linear sensors; a first control section configured to expose the white reference member by the use of the exposure lamp at the time of starting up the apparatus; a selection section configured to select one linear sensor with the maximum output among the linear sensors at the time of starting up the apparatus; a first processing section configured to adjust the gain of the gain amplifier corresponding to the selected linear sensor so that the maximum value of the image data corresponding to one line of the selected linear sensor is equal to a predetermined value and detects the image data at both ends from the image data corresponding to one line of the selected linear sensor after the adjustment; a first determination section configured to determine whether another linear sensor exists to the left side of the selected linear sensor; a second processing section configured to adjust the gain of the gain amplifier corresponding to the linear sensor existing to the left side so that the image data at the right end of the left linear sensor is equal to the image data at the left end of the linear sensor adjacent thereto on the right and detect the image data at the left end from the image data corresponding to one line of the left linear sensor after the adjustment, when the first determination section determines that another linear sensor exists to the left side of the selected linear sensor; a second determination section configured to determine whether another linear sensor exists to the left side of the left linear sensor after the second processing section detects the image data; a second control section which repeats the adjustment and the detection of the second processing section when the second determination section determines that another linear sensor exists to the left side of the left linear sensor; a third determination section configured to determine whether another linear sensor exists to the right side of the selected linear sensor, when the first determination section determines that another linear sensor does not exist to the left side of the selected linear sensor and when the second determination section determines that another linear sensor does not exist to the left side of the left linear sensor; a third processing section configured to adjust the gain of the gain amplifier corresponding to the linear sensor existing to the right side so that the image data at the left end of the right linear sensor is equal to the image data at the right end of the linear sensor adjacent thereto on the left and detect the image data at the right end from the image data corresponding to one line of the right linear sensor after the adjustment, when the third determination section determines that another linear sensor exists to the right side of the selected linear sensor; a fourth determination section configured to determine whether another linear sensor exists to the right side of the right linear sensor after the third processing section detects the image data; and a third control section configured to repeat the adjustment and the detection of the third processing section when the fourth determination section determines that another linear sensor exists to the right side of the right linear sensor, and end the adjustment and the detection of the third processing section when the fourth determination section determines that another linear sensor does not exist to the right side of the right linear sensor.

Hereinafter, an embodiment will be described with reference to the accompanying drawings.

Figure 1:
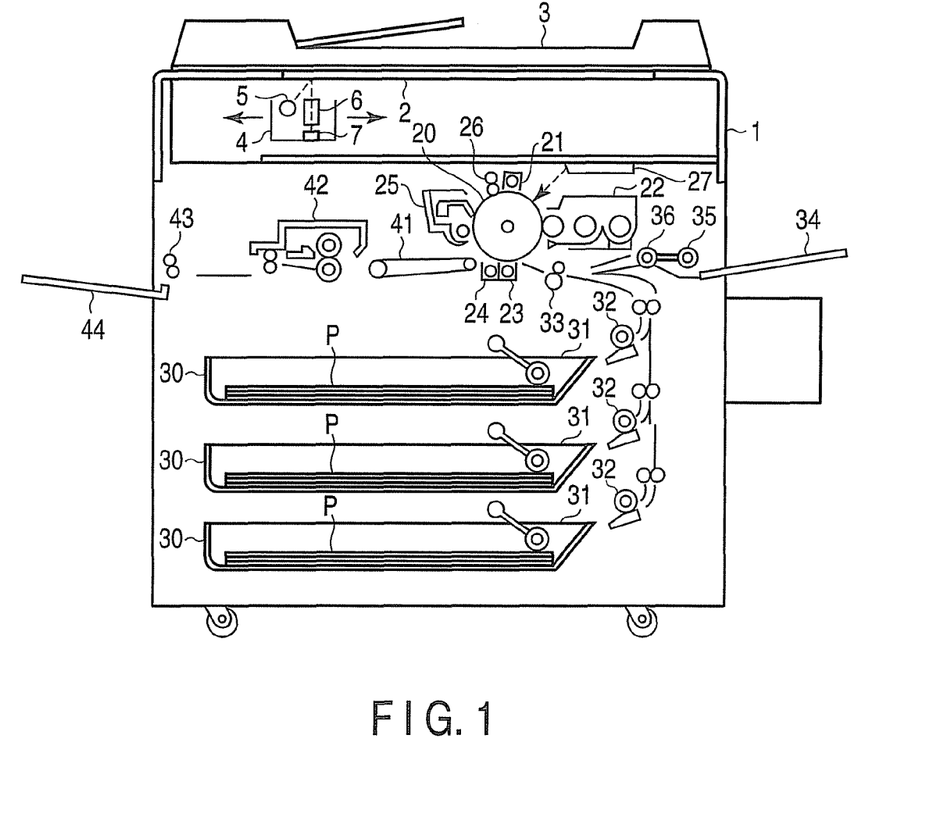
FIG. 1 is a diagram illustrating a configuration of an image reading apparatus according to an embodiment and an image forming apparatus including the image reading apparatus.

As shown in FIG. 1, a main body 1 of an image forming apparatus includes an automatic document feeder (ADF) 3, which can be freely opened and closed, at the top thereof. A transparent document plate 2 on which a document A is set is disposed below the ADF 3. The ADF 3 automatically feeds one or more sheets of original documents A to the document plate 2 sheet by sheet. The document plate 2 includes an indicator 2a. The edge of the indicator 2a serves as a reference position for setting a document.

A carriage 4 is disposed under the bottom of the document plate 2. An exposure lamp 5, a self-focusing lens 6, and a CCD sensor 7 are mounted on the carriage 4. A white reference plate 8 which is a white reference member for correcting the shading is disposed under the bottom of the indicator 2a.

The carriage 4 reciprocates along the bottom of the document plate 2. The exposure lamp 5 exposes the document A and the white reference plate 8 on the document plate 2. Reflected light is generated from the original document A and the white reference plate 8 by this exposure. The CCD sensor 7 receives the reflected light through the self-focusing lens 6.

Figure 2:
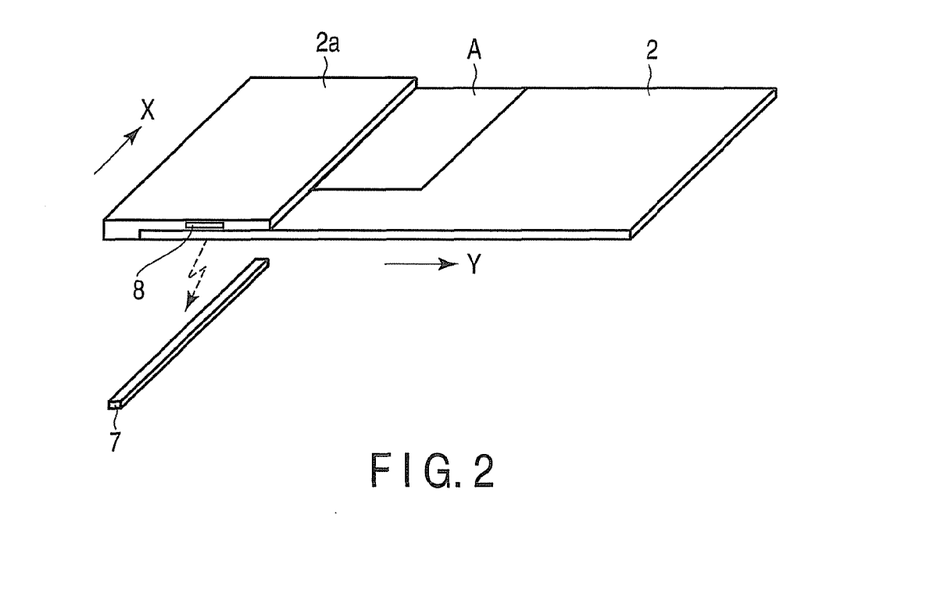
FIG. 2 is a diagram illustrating an original document, a document plate, and a CCD sensor according to the embodiment.

The CCD sensor 7 includes plural linear sensors 50, 60, and 70 (described below) connected in series in a line shape in a direction perpendicular to the reciprocating direction of the carriage 4 and outputs an image signal with a voltage level corresponding to the amount of received light by performing a linear scanning operation using the reflected light received from the original document A or the white reference plate 8. The direction of the linear scanning of the CCD sensor is the main scanning direction X. The forward moving direction of the exposure lamp is the sub scanning direction Y. The length of the main scanning direction X of the CCD sensor 7 is almost equal to the width of the document plate 2.

An image reading apparatus is constructed by components from the document plate 2 to the CCD sensor 7.

On the other hand, as shown in FIG. 1, a photoconductive drum 20 is rotatably disposed substantially at the center of the main body 1. A charging unit 21, a developing unit 22, a transfer unit 23, a peeling unit 24, a cleaner 25, and a neutralization unit 26 are sequentially disposed around the photo-conductive drum 20. A laser beam emitted from a laser unit 27 is applied to the surface of the photoconductive drum 20.

Plural paper feed cassettes 30 are disposed at the bottom of the main body 1. The paper feed cassettes 30 contain plural paper sheets P having different sizes, respectively. At the time of printing an image, the paper sheets P are picked up sheet by sheet from one of the paper feed cassettes 30. For the purpose of picking up the paper sheets, a pickup roller 31 is disposed for each paper feed cassette 30. The picked-up paper sheet P is separated from the paper feed cassette 30 by a corresponding separator 32. A registration roller 33 carries the separated paper sheet P to a space between the photoconductive drum 20 and the transfer unit 23.

The charging unit 21 charges the surface of the photoconductive drum 20 with positive charges by applying a high voltage to the photoconductive drum 20. The laser unit 27 forms an electrostatic latent image on the surface of the photoconductive drum 20 by applying a laser beam to the charged surface of the photoconductive drum 20.

The developing unit 22 develops the electrostatic latent image by supplying toner to the electrostatic latent image on the photoconductive drum 20. The transfer unit 23 transfers a developed image on the photoconductive drum 20 onto the paper sheet P. The peeling unit 24 peels off the paper sheet P, onto which the developed image is transferred, from the photoconductive drum 20. The carrying belt 41 carries the peeled-off paper sheet P to the fixing unit 42. The fixing unit 42 thermally fixes the transferred image on the paper sheet P. A paper discharge roller 43 discharges the fixed paper sheet P to a paper discharge tray 44.

The developer and the charges remain on the surface of the photoconductive drum 20 from which the paper sheet P is peeled off. The cleaner 25 removes the remaining developer. The neutralization unit 26 removes the remaining charges.

A process unit 75, which is described later, printing an image on the paper sheet P is constructed by components from the photoconductive drum 20 to the paper discharge tray 44.

Figure 3:
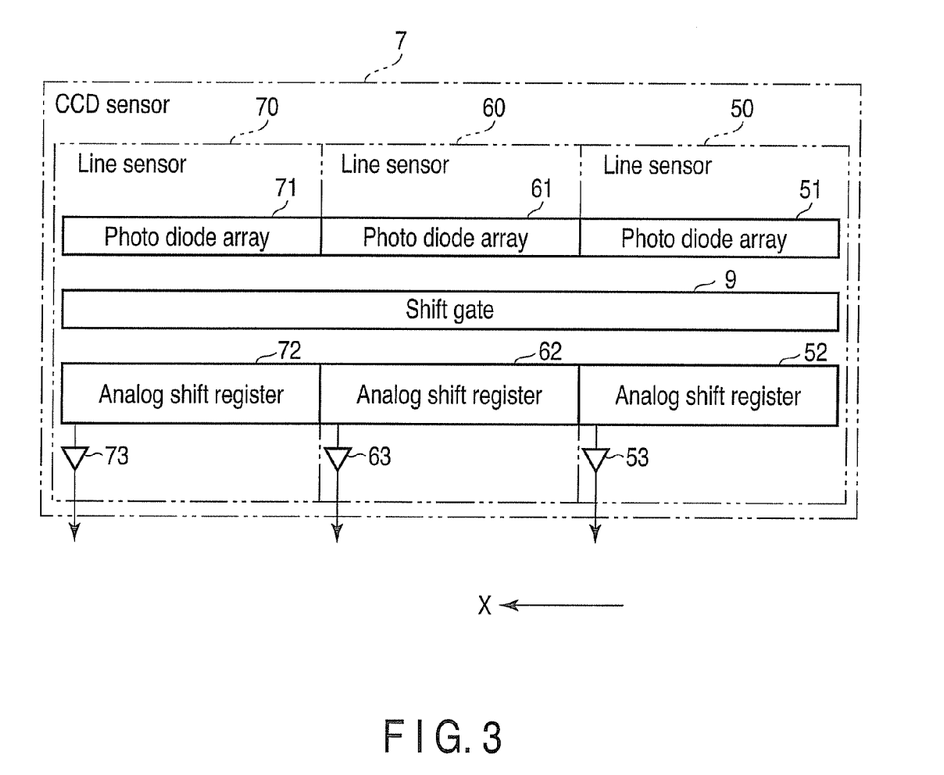
FIG. 3 is a diagram illustrating a configuration of the CCD sensor according to the embodiment.

The CCD sensor 7 includes three linear sensors 50, 60, and 70 connected in series in a line shape. The linear sensor 50 includes a photo diode array 51, a shift gate 9, an analog shift register 52, and a buffer amplifier 53. The linear sensor 60 includes a photo diode array 61, the shift gate 9, an analog shift register 62, and a buffer amplifier 63. The linear sensor 70 includes a photo diode array 71, the shift gate 9, an analog shift register 72, and a buffer amplifier 73.

Figure 4:
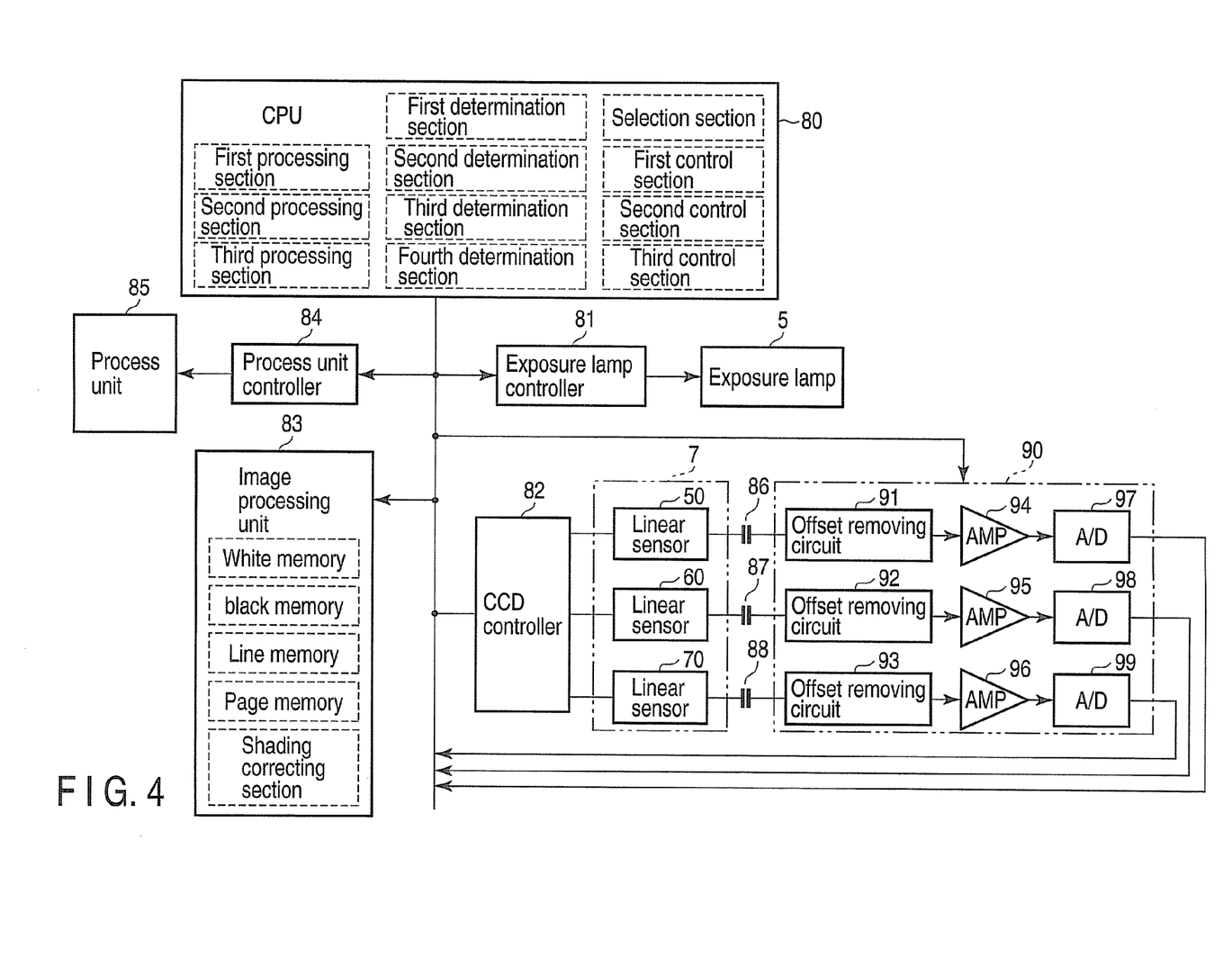
FIG. 4 is a block diagram illustrating a control circuit according to the embodiment.

An exposure lamp controller 81, a CCD controller 82, an image processing unit 83, and a process unit controller 84 are connected to a CPU 80 which is a main controller. The exposure lamp 5 is connected to the exposure lamp controller 81. The CCD sensor 7 is connected to the CCD controller 82. The image processing unit 83 includes a white memory, a black memory, a line memory, a page memory, and a shading correcting section. The process unit 85 is connected to the process unit controller 84.

Output signals of the linear sensors 50, 60, and 70 of the CCD sensor 7 are supplied to an analog processing circuit 90 via capacitors 86, 87, and 88. The analog processing circuit 90 includes offset removing circuits 91, 92, and 93 removing offsets included in the output signals of the linear sensors 50, 60, and 70, gain amplifiers 94, 95, and 96 amplifying the output signals of the offset removing circuits 91, 92, and 93, and analog-to-digital converters 97, 98, and 99 converting the output signals of the gain amplifiers 94, 95, and 96 in an analog-to-digital conversion manner and outputting the converted signals as image data of the linear sensors 50, 60, and 70. The gains of the gain amplifiers 94, 95, and 96 can be adjusted independently.

The CPU 70 includes the following sections (1) to (11) as primary functions:

(1) a first control section exposing the white reference plate 8 by the use of the exposure lamp 5 at the time of starting up the main body 1;

(2) a selection section selecting one linear sensor with the maximum output among the linear sensors 50, 60, and 70 of the CCD sensor 7 on the basis of the image data of the linear sensors 50, 60, and 70 at the time of starting up the main body 1;

(3) a first processing section adjusting the gain of the gain amplifier corresponding to the selected linear sensor so that the maximum value of the image data corresponding to one line of the selected linear sensor is equal to a predetermined value, and detecting the image data at both ends of the image data corresponding to one line of the selected linear sensor after the adjustment, where the predetermined value is a white reference value Dwt initially set at the same time as starting up the main body 1;

(4) a first determination section determining whether another linear sensor exists to the left side of the selected linear sensor on the basis of the image data of the linear sensors 50, 60, and 70;

(5) a second processing section adjusting the gain of the gain amplifier corresponding to the left linear sensor so that the image data at the right end of the left linear sensor is equal to the image data at the left end of the line sensor adjacent thereto on the right, and detecting the image data at the left end from the image data corresponding to one line of the left linear sensor after the adjustment, when the first determination section determines that another linear sensor exists to the left side of the selected linear sensor;

(6) a second determination section determining whether another linear sensor exists on the left of the left linear sensor on the basis of the image data of the linear sensors 50, 60, and 70, after the second processing section detects the image data;

(7) a second control section repeating the adjustment and the detection of the second processing section when the second determination section determines that another linear sensor exists to the left side of the left linear sensor;

(8) a third determination section determining whether another linear sensor exists to the right side of the selected linear sensor on the basis of the image data of the linear sensors 50, 60, and 70, when the first determination section determines that another linear sensor does not exist to the left side of the selected linear sensor and when the second determination section determines that another linear sensor does not exist to the left side of the left linear sensor;

(9) a third processing section adjusting the gain of the gain amplifier corresponding to the right linear sensor so that the image data at the left end of the right linear sensor is equal to the image data at the right end of the line sensor adjacent thereto on the left, and detecting the image data at the right end from the image data corresponding to one line of the right linear sensor after the adjustment, when the third determination section determines that another linear sensor exists to the right side of the selected linear sensor;

(10) a fourth determination section determining whether another linear sensor exists to the right side of the right linear sensor on the basis of the linear sensors 50, 60, and 70, after the third processing section detects the image data; and (11) a third control section repeating the adjustment and the detection of the third processing section when the fourth determination section determines that another linear sensor exists to the right side of the right linear sensor, and ending the adjustment and the detection of the third processing section when the fourth determination section determines that another linear sensor does not exist to the right side of the right linear sensor.

Figure 5:
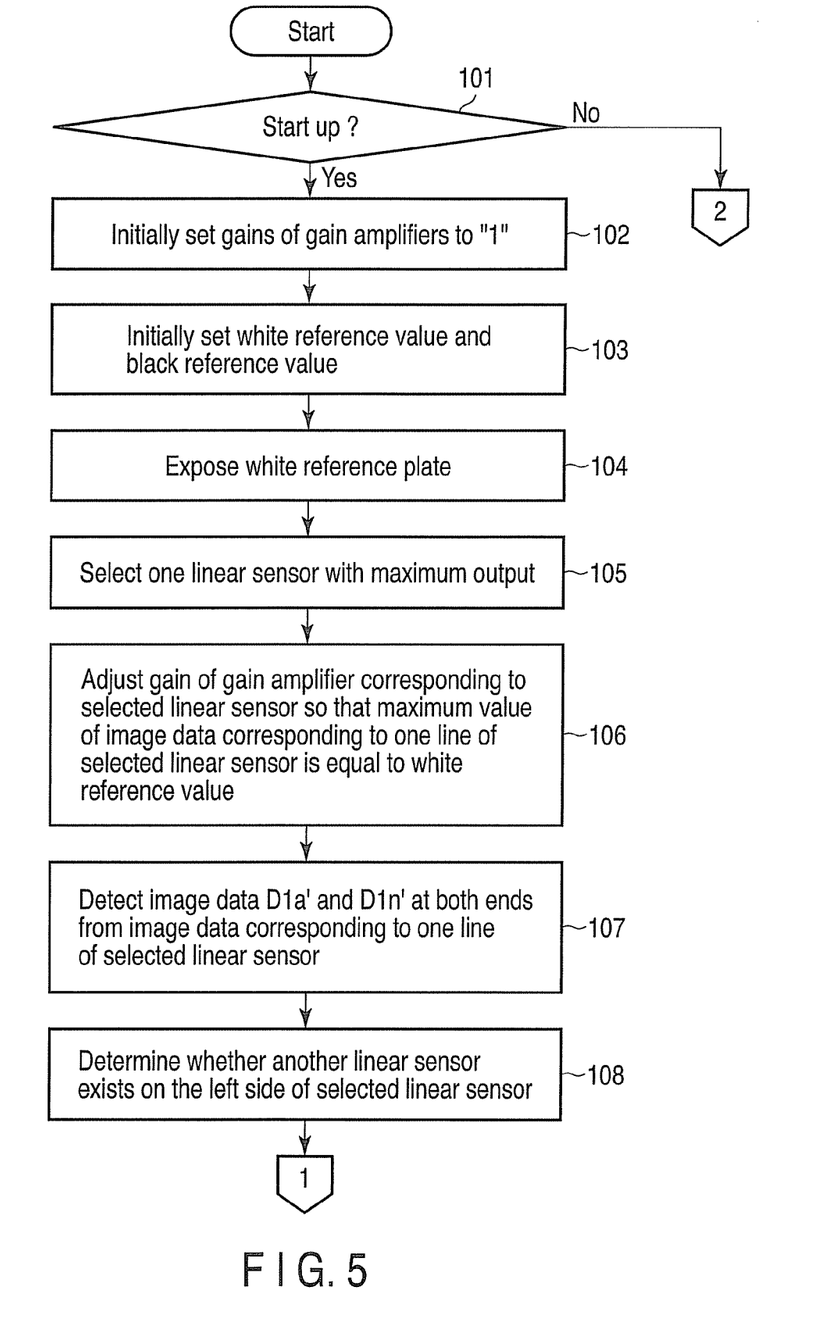
FIG. 5 is a flowchart illustrating a flow of operations according to the embodiment.
Figure 6:
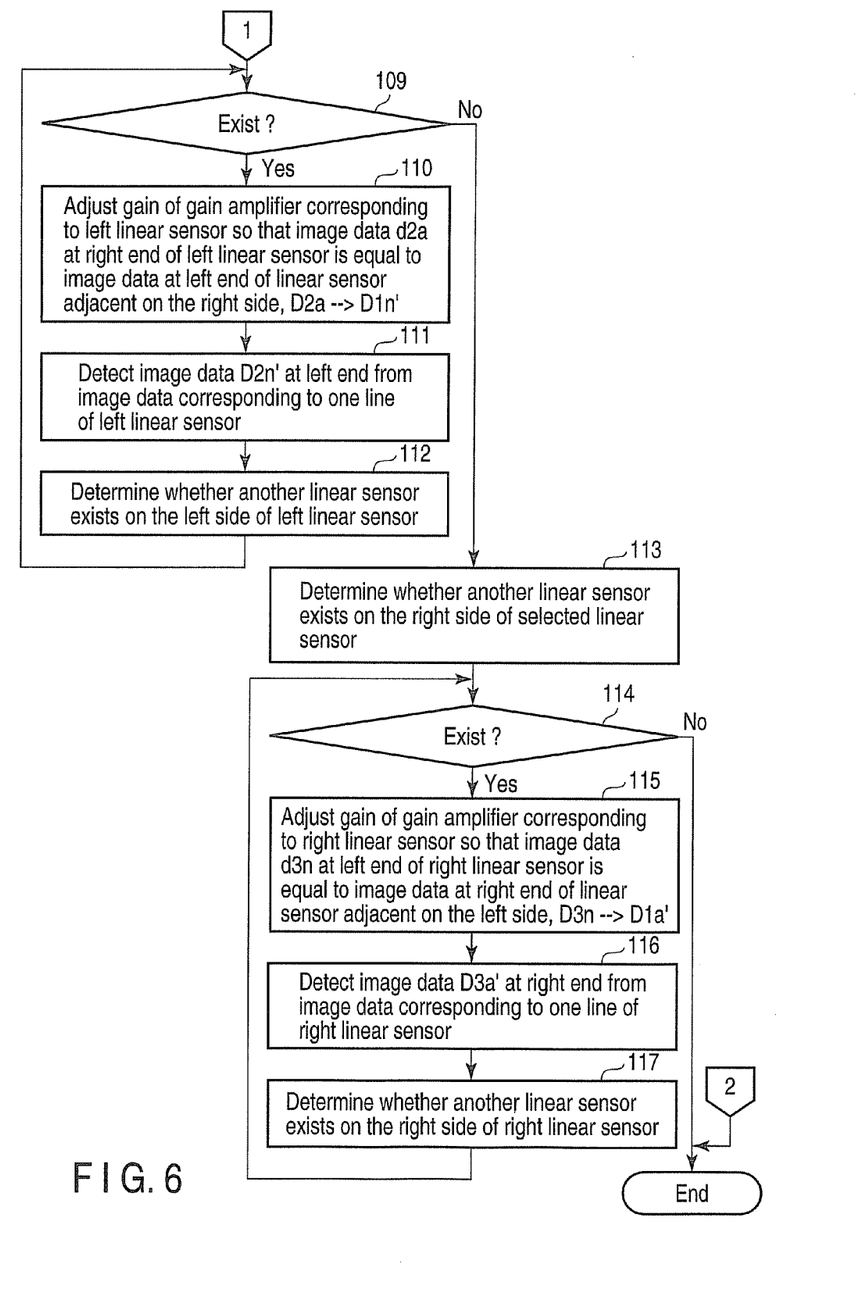
FIG. 6 is a flowchart illustrating a flow of operations subsequent to FIG. 5.

Operations thereof will be described below with reference to FIGS. 5 and 6.

When the main body 1 is started up (YES in ACT 101), the CPU 70 initially sets the gains of the gain amplifiers 94, 95, and 96 to "1" (Act 102), and initially sets the white reference value Dwt and a black reference value Dbt (Act 103). The CPU 70 exposes the white reference plate 8 by the use of the exposure lamp 5 (Act 104).

At the time of start-up, the CPU 70 selects one linear sensor with the maximum output among the linear sensors 50, 60, and 70 of the CCD sensor 7 on the basis of the image data of the linear sensors 50, 60, and 70 (Act 105).

Figure 7:
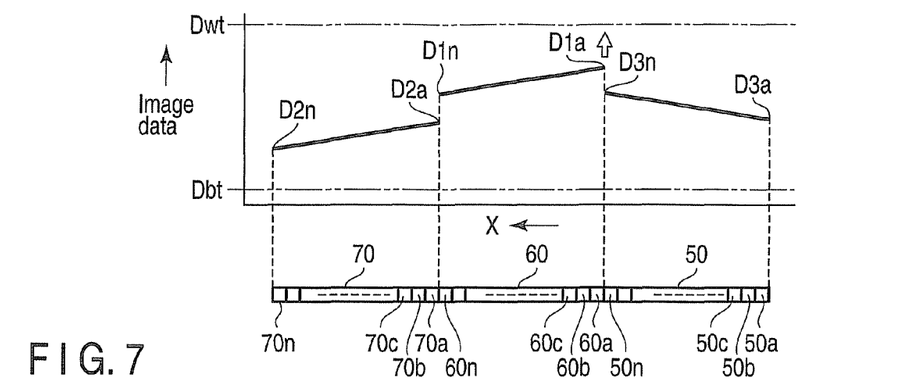
FIG. 7 is a diagram illustrating image data of linear sensors according to the embodiment.

Examples of the image data of the linear sensors 50, 60, and 70 are shown in FIG. 7. The image data corresponding to one line of the linear sensor 50 varies linearly from the image data D3$a$ corresponding to a pixel 50$a$ at the right end to the image data D3$n$ corresponding to a pixel 50$n$ at the left end. The image data corresponding to one line of the linear sensor 60 varies linearly from the image data D1$a$ corresponding to a pixel 60$a$ at the right end to the image data D2$n$ corresponding to a pixel 60$n$ at the left end. The image data corresponding to one line of the linear sensor 70 varies linearly from the image data D2$a$ corresponding to a pixel 70$a$ at the right end to the image data D2$n$ corresponding to a pixel 70$n$ at the left end. In this case, the linear sensor with the maximum output is the center linear sensor 60.

Figure 8:
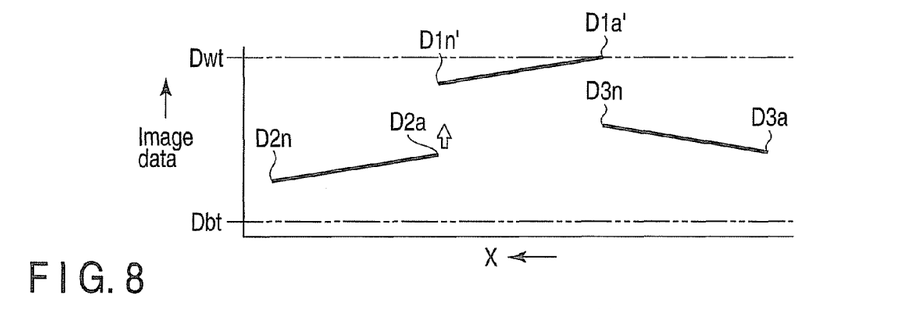
FIG. 8 is a diagram illustrating a state where the maximum value of the image data of a center linear sensor is equal to a white reference value in the embodiment.

The CPU 70 selects the linear sensor 60 with the maximum output. The CPU 70 adjusts the gain of the gain amplifier 95 corresponding to the selected linear sensor 60 so that the maximum value of the image data corresponding to one line of the selected linear sensor is equal to the white reference value Dwt (Act 106). After this adjustment, the CPU 70 detects the image data D1$a$' and D1$n$' at both ends from the image data corresponding to one line of the selected linear sensor 60 (Act 107). The state where the maximum value D1$a$ of the image data of the linear sensor 60 is equal to the white reference value Dwt is shown in FIG. 8. That is, the image data D1$a$' at the right end is the white reference value Dwt. The image data D1$n$' at the left end is calculated on the basis of the slope of the image data D1$a$ to D1$n$ of the linear sensor 60.

Subsequently, the CPU 70 determines whether another linear sensor exists to the left side of the selected linear sensor 60 on the basis of the image data of the linear sensors 50, 60, and 70 (ACT 108). In this case, since the line sensor 70 exists to the left side of the linear sensor 60, the determination result is YES (YES in Act 109).

Figure 9:
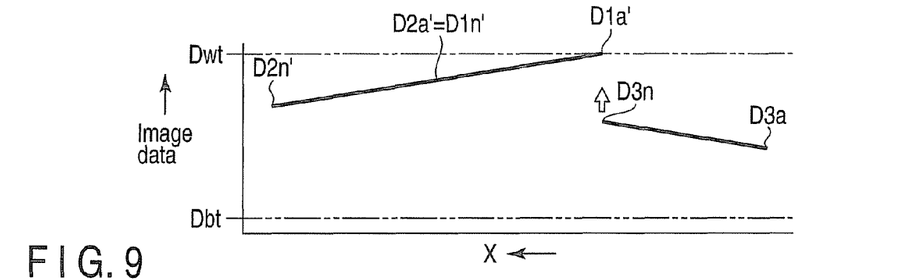
FIG. 9 is a diagram illustrating a state where the image data at the right end of a left linear sensor is equal to the image data at the left end of the center linear sensor in the embodiment.

When the determination result is YES (YES in Act 109), the CPU 70 adjusts the gain of the gain amplifier 96 corresponding to the left linear sensor 70 so that the image data D2$a$ at the right end of the left linear sensor 70 is equal to the image data D1$n$' at the left end of the linear sensor 60 adjacent thereto to the right side (Act 110). After this adjustment, the CPU 70 detects the image data D2$n$' at the left end from the image data corresponding to one line of the left linear sensor 70 (Act 111). The state where the image data D2$a$ at the right end of the linear sensor 70 is equal to the image data D1$n$' at the left end of the linear sensor 60 is shown in FIG. 9. That is, the image data D2$n$' at the left end of the linear sensor 70 is calculated on the basis of the slope of the image data D2$a$ to D2$n$ of the linear sensor 70.

Subsequently, the CPU 70 determines whether another linear sensor exists to the left side of the linear sensor 70 on the basis of the image data of the linear sensors 50, 60, and 70 (ACT 112). In this case, since another line sensor does not exist to the left side of the linear sensor 70, the determination result is NO (NO in Act 109).

When the determination result is NO (NO in Act 109), the CPU 70 determines whether another linear sensor exists to the right side of the selected linear sensor 60 on the basis of the image data of the linear sensors 50, 60, and 70 (Act 113). In this case, since the linear sensor 50 exists to the right side of the linear sensor 60, the determination result is YES (YES in Act 114).

Figure 10:
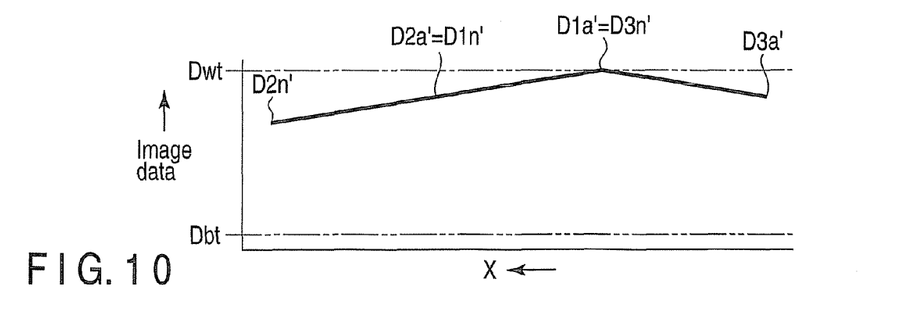
FIG. 10 is a diagram illustrating a state where the image data at the left end of a right linear sensor is equal to the image data at the right end of the center linear sensor in the embodiment.

When the determination result is YES (YES in Act 114), the CPU 70 adjusts the gain of the gain amplifier 94 corresponding to the right linear sensor 50 so that the image data D3a at the left end of the right linear sensor 50 is equal to the image data D1a' at the right end of the linear sensor 60 adjacent thereto to the left side (Act 115). After this adjustment, the CPU 70 detects the image data D3a' at the right end from the image data corresponding to one line of the right linear sensor 50 (Act 116). The state where the image data D3n at the left end of the linear sensor 50 is equal to the image data D1a' at the right end of the linear sensor 60 is shown in FIG. 10. The image data D3a' at the right end of the linear sensor 50 is calculated on the basis of the slope of the image data D3a to D3n of the linear sensor 50.

Subsequently, the CPU 70 determines whether another linear sensor exists to the right side of the linear sensor 50 on the basis of the image data of the linear sensors 50, 60, and 70 (Act 117). In this case, since another linear sensor does not exist to the right side of the linear sensor 50, the determination result is NO (NO in Act 114). Accordingly, the adjustment and the detection are ended. After the end, the CPU 70 performs a process of calculating the white reference value Dwt and the black reference value Dbt for correcting the shading.

Therefore, even when a difference occurs in output at the connecting positions of the linear sensors 50, 60, and 70 of the CCD sensor 7, it is possible to remove the difference. Accordingly, it is possible to remove the concentration spot at the time of forming an image.

Figure 11:
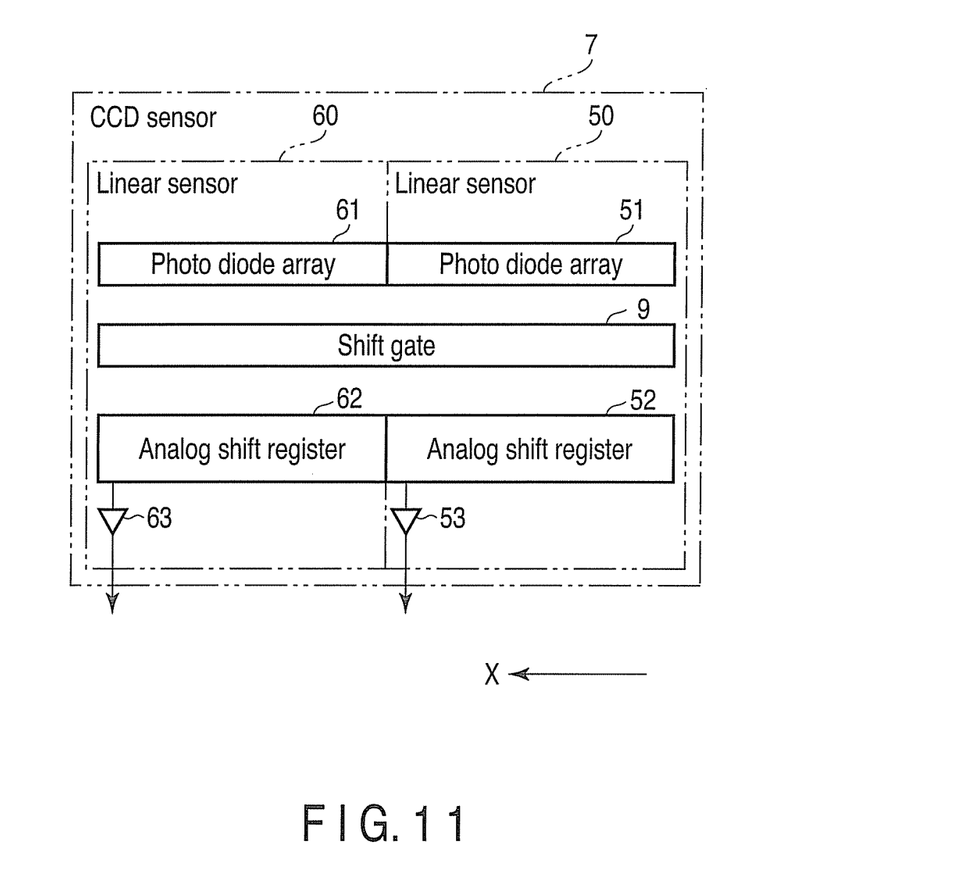
FIG. 11 is a diagram illustrating a configuration of a CCD sensor according to a modified example of the embodiment.

A configuration of a CCD sensor 7 according to a modified example is shown in FIG. 11.

The CCD sensor 7 includes two linear sensor 50 and 60 connected in series in a line shape in the direction perpendicular to the reciprocating direction of the carriage 4, and outputs an image signal with a voltage level corresponding to the amount of received light by performing a linear scanning operation using reflected light received from the original document A or the white reference plate 8. By employing this CCD sensor 7, the capacitor 83, the offset removing circuit 93, the gain amplifier 96, and the analog-to-digital converter 99 corresponding to the linear sensor 70 are not needed.

When the main body 1 is started up (YES in ACT 101), the CPU 70 initially sets the gains of the gain amplifiers 94 and 95 to "1" (Act 102), and initially sets the white reference value Dwt and a black reference value Dbt (Act 103). The CPU 70 exposes the white reference plate 8 by the use of the exposure lamp 5 (Act 104).

At the time of start-up, the CPU 70 selects one linear sensor with the maximum output among the linear sensors 50 and 60 of the CCD sensor 7 on the basis of the image data of the linear sensors 50 and 60 (Act 105).

Figure 12:
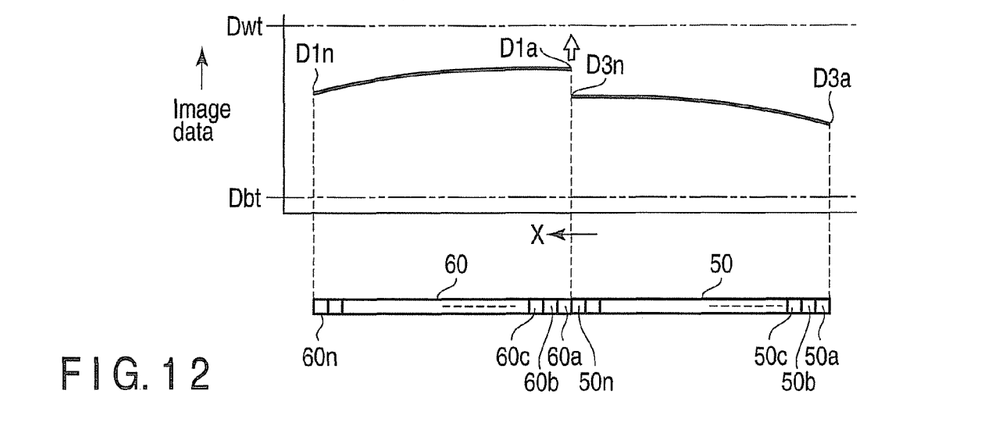
FIG. 12 is a diagram illustrating image data of linear sensors in the modified example.

Examples of the image data of the linear sensors 50 and 60 are shown in FIG. 12. The image data corresponding to one line of the linear sensor 50 varies linearly from the image data D3a corresponding to a pixel 50a at the right end to the image data D3n corresponding to a pixel 50n at the left end. The image data corresponding to one line of the linear sensor 60 varies linearly from the image data D1a corresponding to a pixel 60a at the right end to the image data D1n corresponding to a pixel 60n at the left end. In this case, the linear sensor with the maximum output is the left linear sensor 60.

Figure 13:
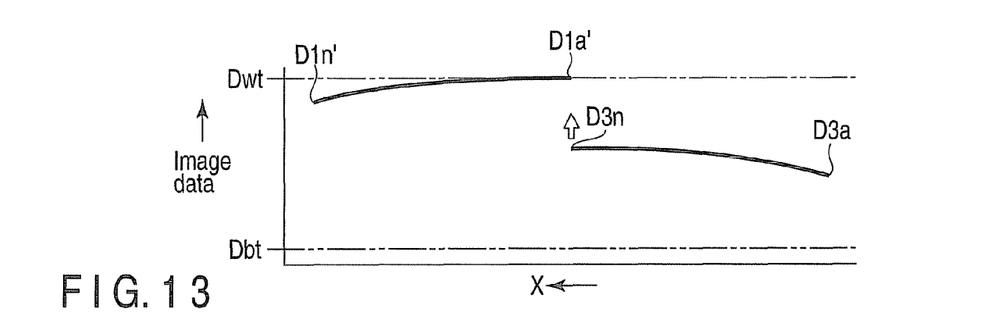
FIG. 13 is a diagram illustrating a state where the maximum value of the image data of the left linear sensor is equal to a white reference value in the modified example.

The CPU 70 selects the linear sensor 60 with the maximum output. The CPU 70 adjusts the gain of the gain amplifier 95 corresponding to the selected linear sensor 60 so that the maximum value of the image data corresponding to one line of the selected linear sensor is equal to the white reference value Dwt (Act 106). After this adjustment, the CPU 70 detects the image data D1a' and D1n' at both ends from the image data corresponding to one line of the selected linear sensor 60 (Act 107). The state where the maximum value D1a of the image data of the linear sensor 60 is equal to the white reference value Dwt is shown in FIG. 13. That is, the image data D1a' at the right end is the white reference value Dwt. The image data D1n' at the left end is calculated on the basis of the slope of the image data D1a to D1n of the linear sensor 60.

Subsequently, the CPU 70 determines whether another linear sensor exists to the left side of the selected linear sensor 60 on the basis of the image data of the linear sensors 50 and 60 (ACT 108). In this case, since another linear sensor does not exist to the left side of the linear sensor 60, the determination result is NO (NO in Act 109).

When the determination result is NO (NO in Act 109), the CPU 70 determines whether another linear sensor exists to the right side of the selected linear sensor 60 on the basis of the image data of the linear sensors 50 and 60 (Act 113). In this case, since the linear sensor 50 exists to the right side of the linear sensor 60, the determination result is YES (YES in Act 114).

Figure 14:
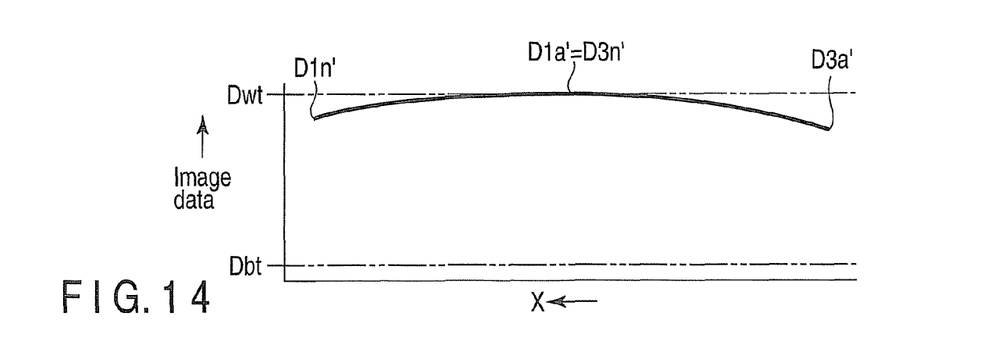
FIG. 14 is a diagram illustrating a state where the image data at the left end of the right linear sensor is equal to the image data at the right end of the left linear sensor in the embodiment.

When the determination result is YES (YES in Act 114), the CPU 70 adjusts the gain of the gain amplifier 94 corresponding to the right linear sensor 50 so that the image data D3a at the left end of the right linear sensor 50 is equal to the image data D1a' at the right end of the linear sensor 60 adjacent thereto to the left side (Act 115). After this adjustment, the CPU 70 detects the image data D3a' at the right end from the image data corresponding to one line of the right linear sensor 50 (Act 116). The state where the image data D3n at the left end of the linear sensor 50 is equal to the image data D1a' at the right end of the linear sensor 60 is shown in FIG. 14. The image data D3a' at the right end of the linear sensor 50 is calculated on the basis of the slope of the image data D3a to D3n of the linear sensor 50.

Subsequently, the CPU 70 determines whether another linear sensor exists to the right side of the linear sensor 50 on the basis of the image data of the linear sensors 50 and 60 (Act 117). In this case, since another linear sensor does not exist to the right side of the linear sensor 50, the determination result is NO (NO in Act 114). Accordingly, the adjustment and the detection are ended.

Although the CIS type in which the CCD sensor 7 moves along the document plate 2 along with the exposure lamp 5 is exemplified in the above-mentioned embodiment, the invention may be similarly applied to a type in which the reflected light from the original document A and the white reference plate 8 is applied to the CCD sensor 7 located at a fixed position via several mirrors and one lens block.

The subjective bodies performing the operations are associated with a computer such as hardware, a combination of hardware and software, software, and software in operation. Although the subjective bodies performing the operations are, for example, processes, processors, object-executing files, threads, programs, and computers, the invention is not limited to these subjective bodies. For example, an image reading apparatus or an application executed therein may be the subjective body performing the operations. The plural subjective bodies performing the operations may be distributed to a process or a thread. The subjective bodies performing the operations may exist in a single image reading apparatus, or may be distributed to plural image reading apparatuses.

Although the functions putting the invention into practice are recorded in advance in the apparatus in this embodiment, the invention is not limited to this configuration. The functions may be downloaded onto the apparatus from a network, or a recording medium storing the functions may be installed in the apparatus. The type of the recording medium is not particularly limited, as long as it is a recording medium which can store programs and which can be read by the apparatus, such as a CD-ROM. The functions obtained by the installation or the download in advance may be embodied in cooperation with the OS (Operating System) of the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image reading apparatus comprising:
   a white reference member;
   an exposure lamp configured to expose an original document and the white reference member;
   a CCD sensor including a plurality of linear sensors connected in series, configured to receive reflected light from the original document or the white reference member, and output an image signal with a voltage level corresponding to the amount of received light;
   a plurality of gain amplifiers configured to amplify the outputs of the linear sensors, respectively;
   an analog-to-digital converter configured to convert the output signals of the gain amplifiers in an analog-to-digital conversion manner and output the converted signals as image data of the linear sensors;
   a first control section configured to configured to expose the white reference member by the use of the exposure lamp at the time of starting up the apparatus;
   a selection section configured to select one linear sensor with the maximum output among the linear sensors at the time of starting up the apparatus;
   a first processing section configured to adjust the gain of the gain amplifier corresponding to the selected linear sensor so that the maximum value of the image data corresponding to one line of the selected linear sensor is equal to a predetermined value and detect the image data at both ends from the image data corresponding to one line of the selected linear sensor after the adjustment;
   a first determination section configured to determine whether another linear sensor exists to the left side of the selected linear sensor;
   a second processing section configured to adjust the gain of the gain amplifier corresponding to the linear sensor existing to the left side so that the image data at the right end of the left linear sensor is equal to the image data at the left end of the linear sensor adjacent thereto on the right and detect the image data at the left end from the image data corresponding to one line of the left linear sensor after the adjustment, when the first determination section determines that another linear sensor exists to the left side of the selected linear sensor;
   a second determination section configured to determine whether another linear sensor exists to the left side of the left linear sensor after the second processing section detects the image data;
   a second control section configured to repeat the adjustment and the detection of the second processing section when the second determination section determines that another linear sensor exists to the left side of the left linear sensor;
   a third determination section configured to determine whether another linear sensor exists to the right side of the selected linear sensor, when the first determination section determines that another linear sensor does not exist to the left side of the selected linear sensor and when the second determination section determines that another linear sensor does not exist to the left side of the left linear sensor;
   a third processing section configured to adjust the gain of the gain amplifier corresponding to the linear sensor existing to the right side so that the image data at the left end of the right linear sensor is equal to the image data at the right end of the linear sensor adjacent thereto on the left and detect the image data at the right end from the image data corresponding to one line of the right linear sensor after the adjustment, when the third determination section determines that another linear sensor exists to the right side of the selected linear sensor;
   a fourth determination section configured to determine whether another linear sensor exists to the right side of the right linear sensor after the third processing section detects the image data; and
   a third control section configured to repeat the adjustment and the detection of the third processing section when the fourth determination section determines that another linear sensor exists to the right side of the right linear sensor, and end the adjustment and the detection of the third processing section when the fourth determination section determines that another linear sensor does not exist to the right side of the right linear sensor.

2. The apparatus of claim 1, wherein each linear sensor outputs the image signal with the voltage level corresponding to the amount of received light by performing a linear scanning operation using the reflected light received from the original document or the white reference member.

3. The apparatus of claim 1, wherein each linear sensor includes a photo diode array, a shift gate, an analog shift register, and a buffer amplifier.

4. The apparatus of claim 1, further comprising a transparent document plate on which the original document is set.

5. The apparatus of claim 1, wherein the predetermined value is a white reference value which is initially set at the same time of starting up the apparatus.

6. The apparatus of claim 1, wherein the selection section selects one linear sensor with the maximum output among the linear sensors on the basis of the image data of the linear sensors at the time of starting up the apparatus,
   wherein the first determination section determines whether another linear sensor exists to the left side of the selected linear sensor on the basis of the image data of the linear sensors, wherein the second determination section determines whether another linear sensor exists to the left side of the left linear sensor on the basis of the image data of the linear sensors after the second processing section detects the image data, wherein the third determination section determines whether another linear sensor exists to the right side of the selected linear sensor on the basis of the image data of the linear sensors, when the first determination section determines that another linear sensor does not exist to the left side of the selected linear sensor and when the second determination section determines that another linear sensor does not exist to the left side of the left linear sensor, and wherein the fourth determination section determines whether another linear sensor exists to the right side of the right linear sensor on the basis of the image data of the linear sensors after the third processing section detects the image data.

7. A control method of an image reading apparatus having a white reference member, an exposure lamp exposing an original document and the white reference member, a CCD sensor including a plurality of linear sensors connected in series, configured to receive reflected light from the original document or the white reference member, and output an image signal with a voltage level corresponding to the amount of received light, a plurality of gain amplifiers which amplifies the outputs of the linear sensors, respectively, and an analog-to-digital converter configured to convert the output signals of the gain amplifiers in an analog-to-digital conversion manner and output the converted signals as image data of the linear sensors, the method comprising:

exposing the white reference member by the use of the exposure lamp at the time of starting up the apparatus;

selecting one linear sensor with the maximum output among the linear sensors at the time of starting up the apparatus;

performing a first process of adjusting the gain of the gain amplifier corresponding to the selected linear sensor so that the maximum value of the image data corresponding to one line of the selected linear sensor is equal to a predetermined value and detecting the image data at both ends from the image data corresponding to one line of the selected linear sensor after the adjustment;

first determining whether another linear sensor exists to the left side of the selected linear sensor;

performing a second process of adjusting the gain of the gain amplifier corresponding to the linear sensor existing to the left side so that the image data at the right end of the left linear sensor is equal to the image data at the left end of the linear sensor adjacent thereto on the right and detecting the image data at the left end from the image data corresponding to one line of the left linear sensor after the adjustment, when it is first determined that another linear sensor exists to the left side of the selected linear sensor;

second determining whether another linear sensor exists to the left side of the left linear sensor after the image data is detected in the second process;

repeating the adjustment and the detection in the second process when it is second determined that another linear sensor exists to the left side of the left linear sensor;

third determining whether another linear sensor exists to the right side of the selected linear sensor, when it is first determined that another linear sensor does not exist to the left side of the selected linear sensor and when it is second determined that another linear sensor does not exist to the left side of the left linear sensor;

performing a third process of adjusting the gain of the gain amplifier corresponding to the linear sensor existing to the right side so that the image data at the left end of the right linear sensor is equal to the image data at the right end of the linear sensor adjacent thereto on the left and detecting the image data at the right end from the image data corresponding to one line of the right linear sensor after the adjustment, when it is third determined that another linear sensor exists to the right side of the selected linear sensor;

fourth determining whether another linear sensor exists to the right side of the right linear sensor after the image data is detected in the third process; and repeating the adjustment and the detection in the third process when it is fourth determined that another linear sensor exists to the right side of the right linear sensor, and ending the adjustment and the detection in the third process when it is fourth determined that another linear sensor does not exist to the right side of the right linear sensor.

8. The method of claim 7, wherein each linear sensor outputs the image signal with the voltage level corresponding to the amount of received light by performing a linear scanning operation using the reflected light received from the original document or the white reference member.

9. The method of claim 7, wherein each linear sensor includes a photo diode array, a shift gate, an analog shift register, and a buffer amplifier.

10. The method of claim 7, wherein the predetermined value is a white reference value which is initially set at the same time of starting up the apparatus.

11. The method of claim 7, wherein the selecting of one linear sensor is performed by selecting one linear sensor with the maximum output among the linear sensors on the basis of the image data of the linear sensors at the time of starting up the apparatus, wherein the first determining is performed by determining whether another linear sensor exists to the left side of the selected linear sensor on the basis of the image data of the linear sensors, wherein the second determining is performed by determining whether another linear sensor exists to the left side of the left linear sensor on the basis of the image data of the linear sensors after the second processing detects the image data, wherein the third determining is performed by determining whether another linear sensor exists to the right side of the selected linear sensor on the basis of the image data of the linear sensors, when the first determination determines that another linear sensor does not exist to the left side of the selected linear sensor and when the second determination determines that another linear sensor does not exist to the left side of the left linear sensor, and wherein the fourth determining is performed by determining whether another linear sensor exists to the right side of the right linear sensor on the basis of the image data of the linear sensors after the third processing detects the image data.

12. An image forming apparatus comprising:
a white reference member;
an exposure lamp configured to expose an original document and the white reference member;
a CCD sensor including a plurality of linear sensors connected in series, configured to receive reflected light from the original document or the white reference member, and output an image signal with a voltage level corresponding to the amount of received light;

a plurality of gain amplifiers configured to amplify the outputs of the linear sensors, respectively;

an analog-to-digital converter configured to convert the output signals of the gain amplifiers in an analog-to-digital conversion manner and output the converted signals as image data of the linear sensors;

a first control section configured to expose the white reference member by the use of the exposure lamp at the time of starting up the apparatus;

a selection section configured to select one linear sensor with the maximum output among the linear sensors at the time of starting up the apparatus;

a first processing section configured to adjust the gain of the gain amplifier corresponding to the selected linear sensor so that the maximum value of the image data corresponding to one line of the selected linear sensor is equal to a predetermined value and detect the image data at both ends from the image data corresponding to one line of the selected linear sensor after the adjustment;

a first determination section configured to determine whether another linear sensor exists to the left side of the selected linear sensor;

a second processing section configured to adjust the gain of the gain amplifier corresponding to the linear sensor existing to the left side so that the image data at the right end of the left linear sensor is equal to the image data at the left end of the linear sensor adjacent thereto on the right and detect the image data at the left end from the image data corresponding to one line of the left linear sensor after the adjustment, when the first determination section determines that another linear sensor exists to the left side of the selected linear sensor;

a second determination section configured to determine whether another linear sensor exists to the left side of the left linear sensor after the second processing section detects the image data;

a second control section configured to repeat the adjustment and the detection of the second processing section when the second determination section determines that another linear sensor exists to the left side of the left linear sensor;

a third determination section configured to determine whether another linear sensor exists to the right side of the selected linear sensor, when the first determination section determines that another linear sensor does not exist to the left side of the selected linear sensor and when the second determination section determines that another linear sensor does not exist to the left side of the left linear sensor;

a third processing section configured to adjust the gain of the gain amplifier corresponding to the linear sensor existing to the right side so that the image data at the left end of the right linear sensor is equal to the image data at the right end of the linear sensor adjacent thereto on the left and detect the image data at the right end from the image data corresponding to one line of the right linear sensor after the adjustment, when the third determination section determines that another linear sensor exists to the right side of the selected linear sensor;

a fourth determination section configured to determine whether another linear sensor exists to the right side of the right linear sensor after the third processing section detects the image data; and a third control section configured to repeat the adjustment and the detection of the third processing section when the fourth determination section determines that another linear sensor exists to the right side of the right linear sensor, and end the adjustment and the detection of the third processing section when the fourth determination section determines that another linear sensor does not exist to the right side of the right linear sensor.

13. The apparatus of claim 12, wherein each linear sensor outputs the image signal with the voltage level corresponding to the amount of received light by performing a linear scanning operation using the reflected light received from the original document or the white reference member.

14. The apparatus of claim 12, wherein each linear sensor includes a photo diode array, a shift gate, an analog shift register, and a buffer amplifier.

15. The apparatus of claim 12, further comprising a transparent document plate on which the original document is set.

16. The apparatus of claim 12, wherein the predetermined value is a white reference value which is initially set at the same time of starting up the apparatus.

17. The apparatus of claim 12, wherein the selection section selects one linear sensor with the maximum output among the linear sensors on the basis of the image data of the linear sensors at the time of starting up the apparatus, wherein the first determination section determines whether another linear sensor exists to the left side of the selected linear sensor on the basis of the image data of the linear sensors, wherein the second determination section determines whether another linear sensor exists to the left side of the left linear sensor on the basis of the image data of the linear sensors after the second processing section detects the image data, wherein the third determination section determines whether another linear sensor exists to the right side of the selected linear sensor on the basis of the image data of the linear sensors, when the first determination section determines that another linear sensor does not exist to the left side of the selected linear sensor and when the second determination section determines that another linear sensor does not exist to the left side of the left linear sensor, and wherein the fourth determination section determines whether another linear sensor exists to the right side of the right linear sensor on the basis of the image data of the linear sensors after the third processing section detects the image data.

* * * * *